May 29, 1934.  A. G. THOMAS  1,960,465
VISCOSIMETER
Filed July 2, 1932    2 Sheets-Sheet 1

Inventor
ALBERT G. THOMAS
By Mason Fenwick Lawrence
Attorneys

May 29, 1934. A. G. THOMAS 1,960,465
VISCOSIMETER
Filed July 2, 1932 2 Sheets-Sheet 2

Inventor
ALBERT G. THOMAS.
By Mason Fenwick Lawrence
Attorneys

Patented May 29, 1934

1,960,465

UNITED STATES PATENT OFFICE 1,960,465

VISCOSIMETER

Albert G. Thomas, Lynchburg, Va.

Application July 2, 1932, Serial No. 620,659

19 Claims. (Cl. 265—11)

The invention forming the subject matter of this application is an instrument designed to determine the viscosity of the lubricating oils commonly used in automobiles.

The object of the invention is to provide an instrument by which a filling station operator can determine accurately the condition of oil in an automobile crank case, and from this determination arrive at a conclusion as to whether or not the oil in the crank case should be changed.

At present, the determination of the condition of lubricating oils by operators of filling stations is usually made by the operators' examining samples of used oil from the engine crank case and feeling or looking at the same in order to make some kind of rough guess as to its condition. There is nothing in common use by these operators which is designed to furnish a scientific test as to the condition of the used oil in an automobile crank case in order to determine whether or not a change of oil is necessary.

Other objects of the invention will become apparent as the detailed description thereof proceeds.

Figure 1:
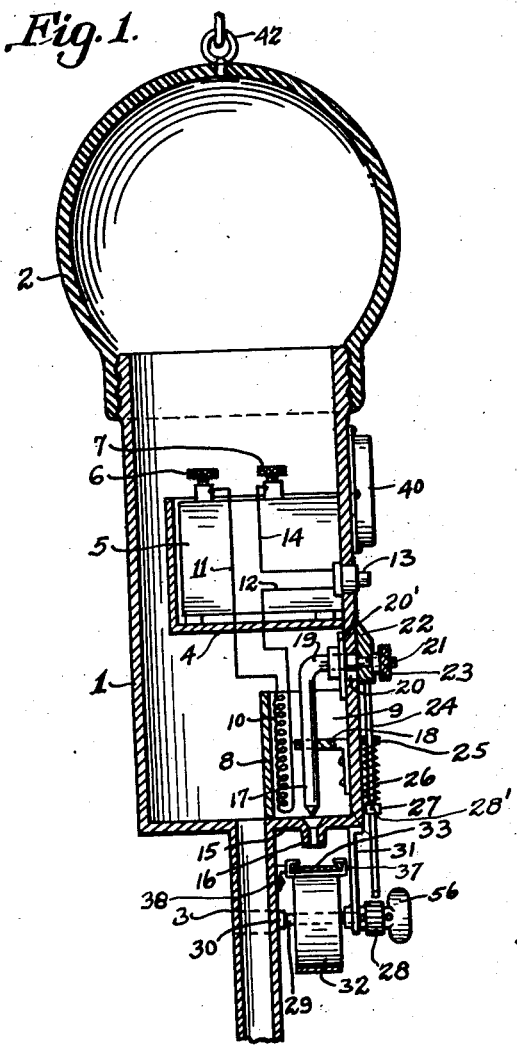
Figure 1 is a central vertical section through an instrument designed to determine the viscosity of lubricating oil.
Figure 2:
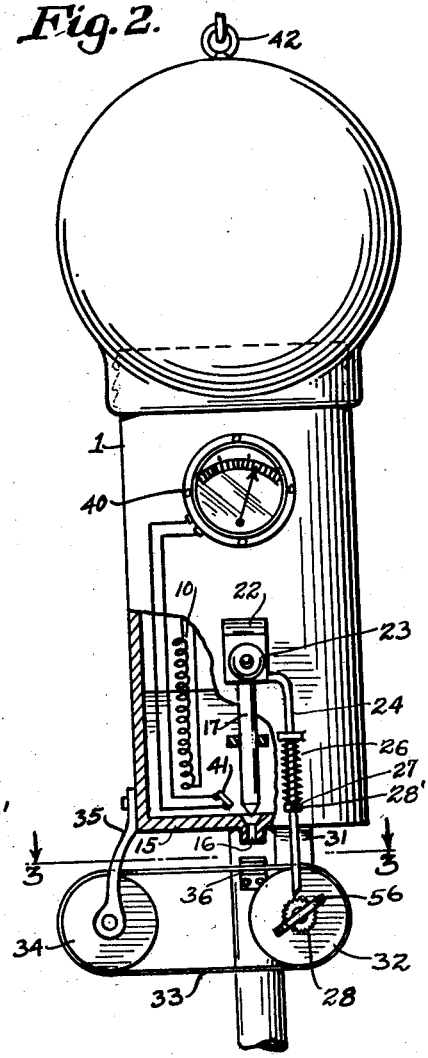
Figure 2 is a front elevation of the instrument shown in Figure 1, parts being broken away and shown in section to illustrate details of construction.
Figure 3:
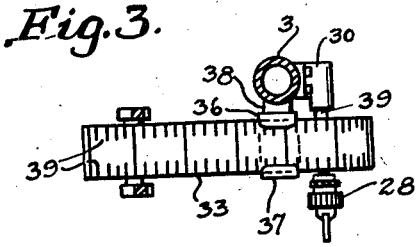
Figure 3 is a horizontal section taken on the line 3—3 of Figure 2.

As shown in Figures 1, 2 and 3, the invention comprises a casing 1 preferably cylindrical and constructed of any suitable material. The upper end of the casing 1 has suitably secured thereto a collapsible bulb 2 preferably of rubber; and the lower end has a pipe 3 extending downwardly therefrom and adapted to enter the crank case and withdraw samples of oil therefrom.

The casing 1 has a shelf 4 extending laterally from one side thereof. A battery 5 is supported by the shelf 4 and is provided with the usual contact terminals 6 and 7. A vertical partition 8 extends transversely across the casing 1 and has its rear face substantially aligned with the pipe 3. The partition 8 forms with the wall of the casing 1 a chamber 9 adapted to receive oil drawn into the casing by means of the bulb 2. The upper edge of the partition 8 constitutes an overflow to insure a given volume and pressure head of lubricating oil being subjected to test at each time by this instrument.

A heating coil 10 is suitably supported in the chamber 9 adjacent the partition 8 and is connected by a wire 11 to the contact terminal 6 of the battery 5; the other end of the coil 10 is connected by a wire 12 to one terminal of a push button switch 13, suitably mounted on the face of the casing 1. The push button 13 has its other terminal connected to the contact terminal 7 by means of the wire 14. The bottom 15 of the chamber 9 is provided with a small aperture 16; and this aperture is normally closed by the lower end of a valve rod 17 slidably mounted in a bracket 18 extending inwardly from the wall of the casing 1. The upper end of the valve rod 17 is bent at right angles to form a branch 19 extending through a slot 20 in the front wall of casing 1. The branch 19 has a clamping plate 20' suitably secured thereto and designed to slide against the inner face of the wall of the casing 1 as the valve rod 17 is moved up or down in its bracket 18.

The branch 19 is provided with a screw-threaded extension 21 passing freely through an outer clamping plate 22 to receive a thumb nut 23. The outer clamping plate 22 has a rod 24 secured thereto and mounted to slide in a bracket 25 fixed to the outside of the casing 1. A coil spring 26, wound around the rod 24, has one end abutting against the lower face of the bracket 25, while the other end abuts a sleeve 27 secured in adjusted position on the rod 24 by means of the setscrew 28'. The pressure of the spring 26 holds the lower end of valve rod 17 normally seated to close the aperture 16.

The lower end of the rod 24 is sharpened to a chisel edge adapted to seat in any of the notches formed on the periphery of a tooth member 28 which is suitably secured to a shaft 29. The shaft 29 is journaled in suitable bearings in a bracket 30 fixed to the pipe 3 and in a bracket 31 depending from the bottom wall of the casing 1. The shaft 29 has secured thereto a drum 32, enclosing a motor, not shown, for driving the drum, over the periphery of which an endless belt 33 passes. An idler pulley 34 rotatably mounted on bracket 35 secured to the casing 1 cooperates with the drum 32 to support the endless belt 33.

The invention is not particularly concerned with the type of motor for rotating the drum 32 so long as the motor is capable of rotating the drum at a substantially constant speed, or may be adjusted to rotate the drum at different constant speeds. The rod 24 is made of such length that its lower end is adapted to seat between any two of the teeth of the member 28 and lock member 28 against rotation when the lower end of the valve rod 17 closes the aperture 16.

It is preferred that the drum 32 be constantly under rotary tension so that as soon as the rod 24 is raised from engagement with the tooth member 28 the drum will at once start rotating to move the belt 33 lengthwise immediately below the aperture 16. The rod 24 will be moved vertically by means of the clamping thumb nut 23 to hold the valve rod 17 at any desired position of adjustment on the casing 1. The upper branch of the endless belt 33 slides between the guide members 36 and 37 formed on a bracket 38, also secured to the pipe 3; and the belt is provided with graduations 39 for indicating the viscosity of the oil under test.

The temperature of the oil under test is indicated on a dial 40 suitably connected to any temperature responsive device 41 arranged in the chamber 9 adjacent to the aperture 16 and the lower end of the valve rod 17.

In the operation of this form of the invention, used oil is drawn from the crank case or other container into the casing 1, which is then suspended by means of a chain or other flexible member 42 to permit the instrument to hang vertically and to drain the excess oil from the pipe 3. It will be understood, of course, that sufficient oil must be drawn through the pipe 3 to fill the chamber 9. The vertical suspension of the instrument permits the oil to reach the level of the upper end of the partition 8 and thus insures a definite quantity and especially a definite head submitted for test by the instrument. When the excess oil has drained from the pipe 3, the push button 13 is operated to cause the heater 10 to heat the oil in the chamber 9 up to any desired temperature which may be indicated on the dial 40. As soon as the oil under test has reached this desired temperature, the operator manipulates the thumb nut 23 to open the aperture 16 and release the drum 32 to permit the oil from the chamber 9 to drop through the aperture 16 on to the belt 33 as it passes thereunder. The viscosity of the oil relative to oil of a given standard or relative to any other standard may be determined by the separation between successive drops of oil from the chamber 9 on the scale 39 of the belt 33. The test requires a few seconds, and the hydrostatic head of the oil in the chamber 9 does not change materially for the period required to obtain a reading since only a few drops are required for the test.

The operation of the instrument may be stopped at any instant, merely by releasing the clamping nut 23 to permit the compression spring 26 to force the valve rod 17 to its seat and the end of the rod 24 into locking engagement with the tooth member 28 of the drum 32.

Figure 4:
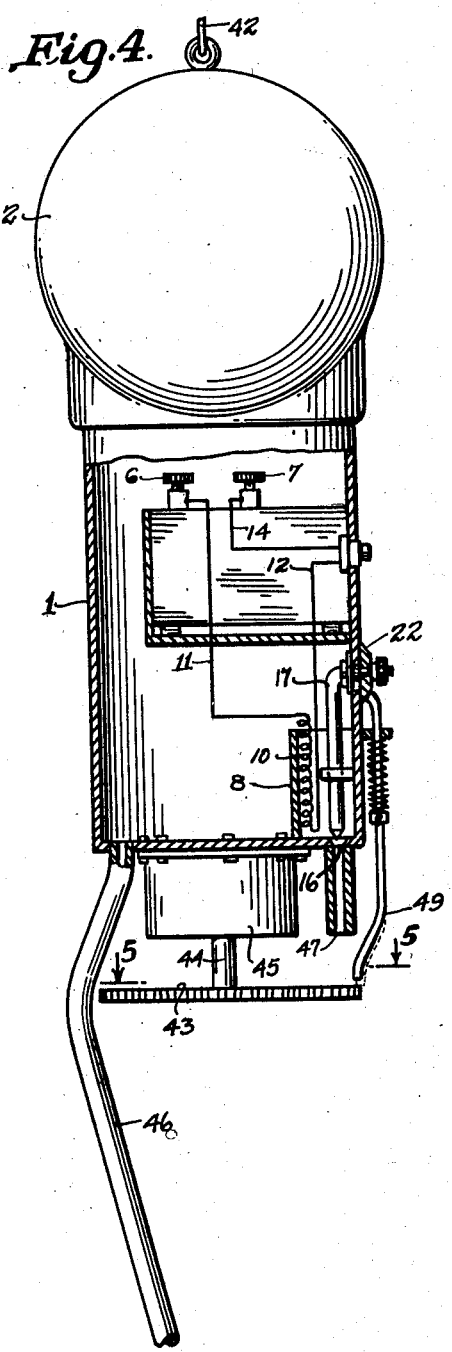
Figure 4 is a fragmentary view of a modified form of the device shown in Figures 1 and 2, part of said device being shown in elevation and part in vertical section.
Figure 5:
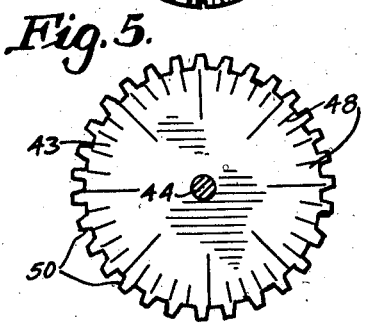
Figure 5 is a horizontal section on the line 5—5 of Figure 4.

In the modification shown in Figures 4 and 5, the parts of the apparatus within the casing 1 are identical with the parts shown in Figure 1. The same sliding valve movement is used but in this instance the graduated endless belt 33 is replaced by a rotatable graduated disk 43. The disk 43 is mounted on the shaft 44 of a motor 45, and the pipe 46, suitably bent to permit rotation of the disk 43, extends from the bottom of the casing 1 for use in withdrawing oil from a crank case or other container.

The aperture 16 in this form has the tube 47 extending downwardly therefrom to conduct the drops on to the scale 48 formed on the disk 43. In this form of the invention, the cooperative locking effect between the valve rod 17 and the rotating disk 43 is effected by securing a locking rod 49 to the clamping plate 22. The lower end of the rod 49 is shaped to enter the notches 50 formed in the edge of the disk 43. A coil spring construction similar to that illustrated in Figure 1 forces the rod 49 normally into locking engagement with the notches on the edge of the disk 43, and closes the aperture 16 at the same time.

Figure 6:
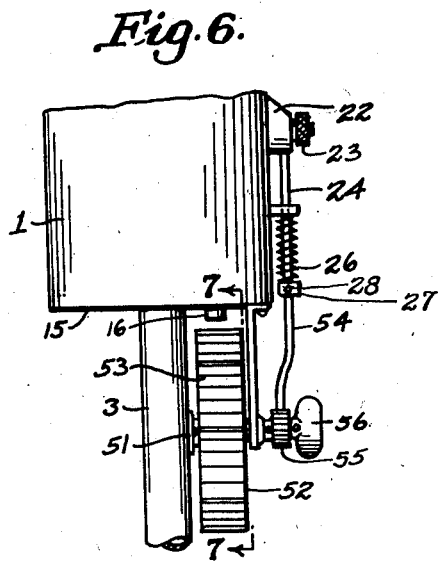
Figure 6 is a fragmentary side elevation of a further modified form of the invention.
Figure 7:
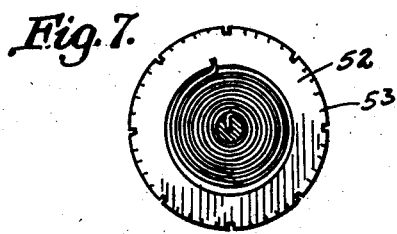
Figure 7 is a vertical section taken on the line 7—7 of Figure 6.

The form of the invention shown in Figures 6 and 7 varies from the other forms only in the scale members secured to the bottom of the instrument. In this form, the pipe 3 is provided with a bracket 51 supporting a spring wound drum 52 having a scale 53 formed on the periphery which is arranged below the aperture 16 of the casing 1 for the same purpose as in the other modification. The cooperating lock effect in this form of the invention is secured by means of a rod 54 fixed to the clamping plate 22 in place of the rod 24 of the form shown in Figure 1. The lower end of the rod 54 is likewise sharpened to a chisel edge to seat between any two teeth of a toothed member 55 formed on the shaft of the drum 52 to lock the drum against rotation when the valve is closed. Where the drums 32 or 52, are of the spring wound type, they may be provided with a thumb nut 56 in order to effect the winding of the motors manually when desired.

In the operation of the various forms of this invention, it is desirable that the test be made always at the same temperature. However, the invention is not limited to such use, since temperature differences may be allowed for by adding to or substracting from the readings on the belt or drum members; or, compensation for different oil temperature may be obtained by varying the speeds of the drum or the endless belt. In all forms of this invention, it is preferable to score the marks rather deeply into the indicating surfaces so as to prevent undue spreading of the oil and to give as sharp readings as possible.

It is thought that the invention and numerous of its attendant advantages will be understood from the foregoing description and it is obvious that numerous changes may be made in the form, construction and arrangement of the several parts without departing from the spirit or scope of my invention or sacrificing any of its attendant advantages; the forms herein described being preferred embodiment for the purpose of illustrating my invention.

What I claim is:

1. A viscosimeter comprising a container having a small bore aperture through the bottom thereof, a scale member, means for moving said scale member at a constant speed below and across said aperture, and a valve for opening and closing said aperture.

2. A viscosimeter comprising a container having a small bore aperture through the bottom thereof, a scale member, means for moving said scale member at a constant speed below and across said aperture, a valve slidably mounted on said container to control said aperture, and means for locking said valve in open position.

3. A viscosimeter comprising a container having a small bore aperture through the bottom thereof, a scale member, means for moving said scale member at a constant speed below and across said aperture, a valve slidably mounted on said container to control said aperture, means for automatically moving said valve to close said aperture, and means for locking said valve in open position.

4. A viscosimeter comprising a container having a small bore aperture through the bottom thereof, a scale member, means for moving said scale member at a constant speed below and across said aperture, a valve slidably mounted on said container to control said aperture, means for automatically moving said valve to close said aperture, means for locking said valve in open position, and a heating element arranged in said container.

5. A viscosimeter comprising a container having a small bore aperture through the bottom thereof, a scale member, means for moving said scale member at a constant speed below and across said aperture, a valve slidably mounted on said container to control said aperture, means for automatically moving said valve to close said aperture, means for locking said valve in open position, a heating element arranged in said container, and means for controlling the operation of said heating element.

6. A viscosimeter comprising a container having a small bore aperture through the bottom thereof, a scale member, means for moving said scale member at a constant speed below and across said aperture, a valve slidably mounted on said container to control said aperture, means for automatically moving said valve to close said aperture, means for locking said valve in open position, a heating element arranged in said container, means for controlling the operation of said heating element, and means for indicating the temperature of liquid in said container.

7. A portable viscosimeter comprising a container having suction means at one end thereof and a pipe at the other end adapted to conduct liquid into said container, a partition in said container and forming therewith a chamber at one side of said pipe, the bottom of said chamber having a small bore aperture therethrough, a scale movably mounted below said aperture, and means for moving said scale at a constant speed past said aperture.

8. A viscosimeter comprising a container having a small bore aperture through the bottom thereof, a scale member, means for moving said scale member at a constant speed below and across said aperture, a valve slidably mounted on said container to control said aperture, means for locking said valve in open position, and means connected to said valve locking means for locking said moving means when the valve is in aperture closing position.

9. A viscosimeter comprising a container having a small bore aperture through the bottom thereof, a scale member, means for moving said scale member at a constant speed below and across said aperture, a valve slidably mounted on said container to control said aperture, means for locking said valve in open position, means connected to said valve locking means for locking said moving means when the valve is in aperture closing position, and means in said chamber for heating liquid therein.

10. A viscosimeter comprising a container having a small bore aperture through the bottom thereof, a scale member, means for moving said scale member at a constant speed below and across said aperture, a valve slidably mounted on said container to control said aperture, means for locking said valve in open position, means connected to said valve locking means for locking said moving means when the valve is in aperture closing position, means in said chamber for heating liquid therein, and means for indicating the temperature of liquid in said chamber.

11. A viscosimeter comprising a container having a small bore aperture through the bottom thereof, a scale member, means for moving said scale member at a constant speed below and across said aperture, a valve slidably mounted on said container to control said aperture, means for locking said valve in open position, means connected to said valve locking means for locking said moving means when the valve is in aperture closing position, means in said chamber for heating liquid therein, means for controlling the operation of said heating means, and means for indicating the temperature of liquid in said chamber.

12. A viscosimeter comprising a container having a small bore aperture through the bottom thereof, a scale member, means for supporting said scale member for rectilinear movement below and across said aperture, and means for so moving said scale member.

13. A viscosimeter comprising a container having a small bore aperture through the bottom thereof, a rotatable scale member mounted to have its edge rotate below and across said aperture, and means for rotating said member.

14. A viscosimeter comprising a container having a small bore aperture through the bottom thereof, a disk mounted to rotate on said container about an axis parallel to the axis of said bore, and means for rotating said disk at a constant speed, said disk being provided with graduations intersected by the axis of said aperture.

15. A viscosimeter comprising a container having a small bore aperture through the bottom thereof, a disk mounted to rotate on said container about an axis parallel to the axis of said bore, means for rotating said disk at a constant speed, said disk being provided with graduations intersected by the axis of said aperture, a valve slidably mounted on said container to control said aperture, and means for clamping said valve at any desired distance from said aperture.

16. A viscosimeter comprising a container having a small bore aperture through the bottom thereof, a disk mounted to rotate on said container about an axis parallel to the axis of said bore, means for rotating said disk at a constant speed, said disk being provided with graduations intersected by the axis of said aperture, a valve slidably mounted on said container to control said aperture, means for clamping said valve in open position, and cooperating means on said disk and valve clamping means for locking the disk against rotation when the valve is closed.

17. A viscosimeter comprising a container having a small bore aperture through the bottom thereof, a drum rotatable below said aperture and about an axis perpendicular to the axis of said aperture, said drum having a scale formed on the periphery thereof, means for rotating said drum at a constant speed, a valve controlling said aperture, means for automatically moving said valve to aperture closing position, and cooperating means connected to said valve and drum for locking the drum against rotation when the valve is closed.

18. A viscosimeter comprising a container having a small bore aperture through the bottom thereof, a scale member movable below said aperture, means for moving said member at a constant speed past said aperture, and means for automatically closing said valve and locking said moving means.

19. A viscosimeter comprising a container having a small bore aperture through the bottom thereof, a valve controlling said aperture, a scale member movable below said aperture, means for moving said member at a constant speed past said aperture, means for automatically closing said valve and locking said moving means, and controllable means for heating liquid in said container.

ALBERT G. THOMAS.